United States Patent [19]

Böber et al.

[11] Patent Number: 5,383,940
[45] Date of Patent: Jan. 24, 1995

[54] PROCESS OF PRODUCING SOLID SODIUM CYANIDE

[75] Inventors: Reinhard Böber, Weimar; Walter Spielmann, Schwedt, both of Germany

[73] Assignee: Glatt Ingenieurtechnik GmbH, Weimer, Germany

[21] Appl. No.: 155,781

[22] Filed: Nov. 23, 1993

[30] Foreign Application Priority Data

Dec. 1, 1992 [DE] Germany ............................. 4240318

[51] Int. Cl.$^6$ ............................................. C22B 1/14
[52] U.S. Cl. ............................... 23/313 FB; 23/293 R
[58] Field of Search ..................... 23/313 FB, 293 R; 423/371

[56] References Cited

U.S. PATENT DOCUMENTS

| | | | |
|---|---|---|---|
| 3,206,278 | 9/1965 | Green | 423/371 |
| 3,207,574 | 9/1965 | Popper | 23/79 |
| 3,849,233 | 11/1974 | Lykov et al. | 23/313 FB |
| 4,946,653 | 8/1990 | Stopp et al. | 23/313 FB |

FOREIGN PATENT DOCUMENTS 969731  7/1958  Germany .
1120437  7/1962  Germany .
1928872  1/1973  Germany .
246226  6/1987  Germany .

*Primary Examiner*—Wayne Langel
*Attorney, Agent, or Firm*—Jacobson, Price, Holman & Stern

[57] ABSTRACT

Invention relates to a process of producing solid sodium cyanide. The process according to the invention is characterized in that an aqueous sodium cyanide solution (1) of 30 to 45% by mass, containing up to 5% by mass solids, is granulated in two process steps in counterflow with heated air, wherein in the first process step a fluidized bed is produced in a fluidized bed granulator (4) by means of hot air (5) from the second process step, in so doing the air being cooled down to a temperature of 60° to 90° C. a sodium cyanide granulate of 2 to 6 mm being set in a classifying discharge duct (16) and the same being dried to a residual moisture of 1.5 to 4% by mass, wherein in the second process step in a further fluidized bed of a drier (14) the granulate produced is dried through an air current (25) with initial temperatures of 150° to 230° C. to a residual moisture settable at liberty of less than 1.5% by mass and is removed by way of a cellular wheel (20).

5 Claims, 1 Drawing Sheet

PROCESS OF PRODUCING SOLID SODIUM CYANIDE

FIELD OF THE INVENTION

The invention relates to a process of producing solid sodium cyanide with high purity, improved handling properties and without obtaining contaminants.

BACKGROUND OF THE INVENTION

As is generally known, the production of solid sodium cyanide from its solutions takes place through the process steps of crystallization, dehydration, drying or according to The principle of spray drying.

All these process steps are known and described in the widest variety of embodiments.

Also known is the further processing to form compacts, briquettes or tablets, as is imperative for the safe handling of the solid cyanide.

Drawbacks are the high expenditure and that the systems are in some cases technically difficult to control (German Patent Specification No. 1120437). The production of granulates through compacting requires e.g. a specific moisture and composition. Solid sodium cyanide is compactable without any difficulty only with a water content between 0.2 and 1% by mass. In case of the moisture content being too low, the compact disintegrates. If the moisture is greater than 1% by mass, the compactor becomes congiutinated. This moisture range is however severely limited by the internationally standard quality requirements (max. 2% by mass impurities and water), because conditioned by raw material impurities and necessary residual alkalinity in the neutralization step of the NaCN process, other substances are present in far more than 1% by mass.

Extreme requirements relating to the narrowly restricted working range of the drying step (0.2–0.4% by mass $H_2O$) thereby ensue. Relatively large contents of sodium formate also impede the formation of compacts. In U.S. Pat. No. 3,207,574 the iron content is regarded as one of the main factors for the compactability.

In German laid open print No. 1928872 temperatures of 125°–225° C. are specified for the compacting. This range involves very high expenditure of energy for the purposes of compacting.

The NaCN solid products (compacts, tablets, briquettes) produced according to the known technologies furthermore have critical drawbacks in respect of their application and handling properties.

1. In most cases of application NaCN is employed in the form of solutions, i.e. the NaCN present in pressed forms is dissolved again. Due to the smooth surface, the size of the compacts and the high density, this process requires considerable dissolving time and high expenditure of energy.

2. Due to the sharp edgedness and the formation of burrs at the edges of the compacts, considerable abrasion is experienced in filling the transport receptacle as well as during transport, leading to dust nuisance and exposure to danger in handling.

Considerable defects are also to be noted for the crystallization stage. If temperatures of approx. 65° C. are not observed, formate is produced, negatively affecting the quality of the end product. This requires however considerable expenditure for the vacuum generation. Vapours obtained in the process with an ammonia content of approx. 1500 ppm and a cyanide content of approx. 1000 ppm have to be detoxicated and freed of ammonia.

In addition, in using a discontinuous crystallizer, the heat of reaction obtained in the neutralization step cannot be utilized, because the intermediate storage has to take place at temperatures of about 50° C. owing to the danger of formate being produced (DD-WP 246 226).

With the principle of spray drying according to German Pat. Specification No. 969 731 these drawbacks are indeed eliminated, but danger-free, safe handling of the dried, fine NaCN powder is not constituted. Therefore it has to be compacted, giving rise to the above-described difficulties.

Further problems may arise in the intermediate storage of the NaCN powder by clotting and bridging.

Altogether, in the previous procedures there has been very high expenditure in apparatus and a considerable potential in technological and technical factors leading to faults.

SUMMARY OF THE INVENTION

The invention is aimed at developing an economical process of producing solid sodium cyanide with good handling properties and of high purity from a solution, which process is distinguished by tow expenditure in apparatus and can be conducted without obtaining contaminants.

The object underlying the invention is to provide a method with which readily soluble sodium cyanide having good dosing and storing properties is produced without obtaining mother liquor or other waste. This is achieved according to the invention in that aqueous sodium cyanide solution is processed in two process steps to form sodium cyanide granulate, the first step representing a fluidized bed granulator and the second step a drier, by way of example in the form of a fluidized bed channel.

The sodium cyanide granulate can be set to have any water content and any diameter. The essence of the invention is characterized in that an aqueous sodium cyanide solution is passed via a nozzle by way of a dosing apparatus into a fluidized bed of a granulator with a classifying discharge duct, the solution in droplets settling on fluidized granules in the fluidized bed, the water being taken up by air from the downstream drying stage and removed and the granules increasing in size then leaving the fluidized bed when their resistance is greater than the ascending force of fresh air in the central discharge duct. The discharged granules have a diameter of 2 to 6 mm. The residual moisture is at 1.5 to 4% by mass water.

By means of a subsequent fluidized bed drying in a drier, the final moisture of the granulate can be set to any final value. Drying agent is air purified of carbon dioxide with a temperature of 150°–230° C. at the air intake. In case of quality problems as a result of raw material impurities, the process offers the possibility for instance that, in contradistinction to the compacting process, the water content be selected to be smaller than 0.2% by mass.

On the other hand it has become apparent that in case of lower purity requirements it is quite possible for water contents of greater than 1% by mass to be set, without conceding to any restrictions as to handling, for instance through conglutinating or agglomerating. A further advantage of the process according to the invention consists in the good water solubility of the granulate formed, this being of especial significance for the further processing. Dustlike sodium cyanide is separated from the outgoing air by a cyclone and recycled to the fluidized bed as granulation nuclei. The process operates free from waste and contaminants, because the smallest dust particles of sodium cyanide are washed out in a wet separation and are recycled to the granulation process by way of a pump. A particular advantage of the process according to the invention consists in the low expenditure in apparatus compared to previous processes and substantially lower consumption of energy compared with the spray drying—compacting combination. In addition, compared to the process with expulsion of mother liquor, the yield is increased and compared with the spray drier the heat content of the air drying agent can be optimally utilized through the two-step method of procedure. A solution of 30 to 45% by mass NaCN is used, a solids content of up to 5% by mass not having a disturbing effect. It is also advantageous that an NaCN solution produced in a continuous neutralization can be used directly in the process of the invention, utilizing the developed heat of reaction.

This is possible because through the short dwell times a detectable formation is formate is not to be noted. The bin and a dosing pump are dispensed with. The washing liquor concentrated in the wet separator is recycled directly to the granulator by way of a pump.

BRIEF DESCRIPTION OF THE DRAWINGS

The invention will be explained in further detail by means of an example. The appertaining drawing.

DETAILED DESCRIPTION OF THE PREFERRED EMBODIMENTS

Figure 1:
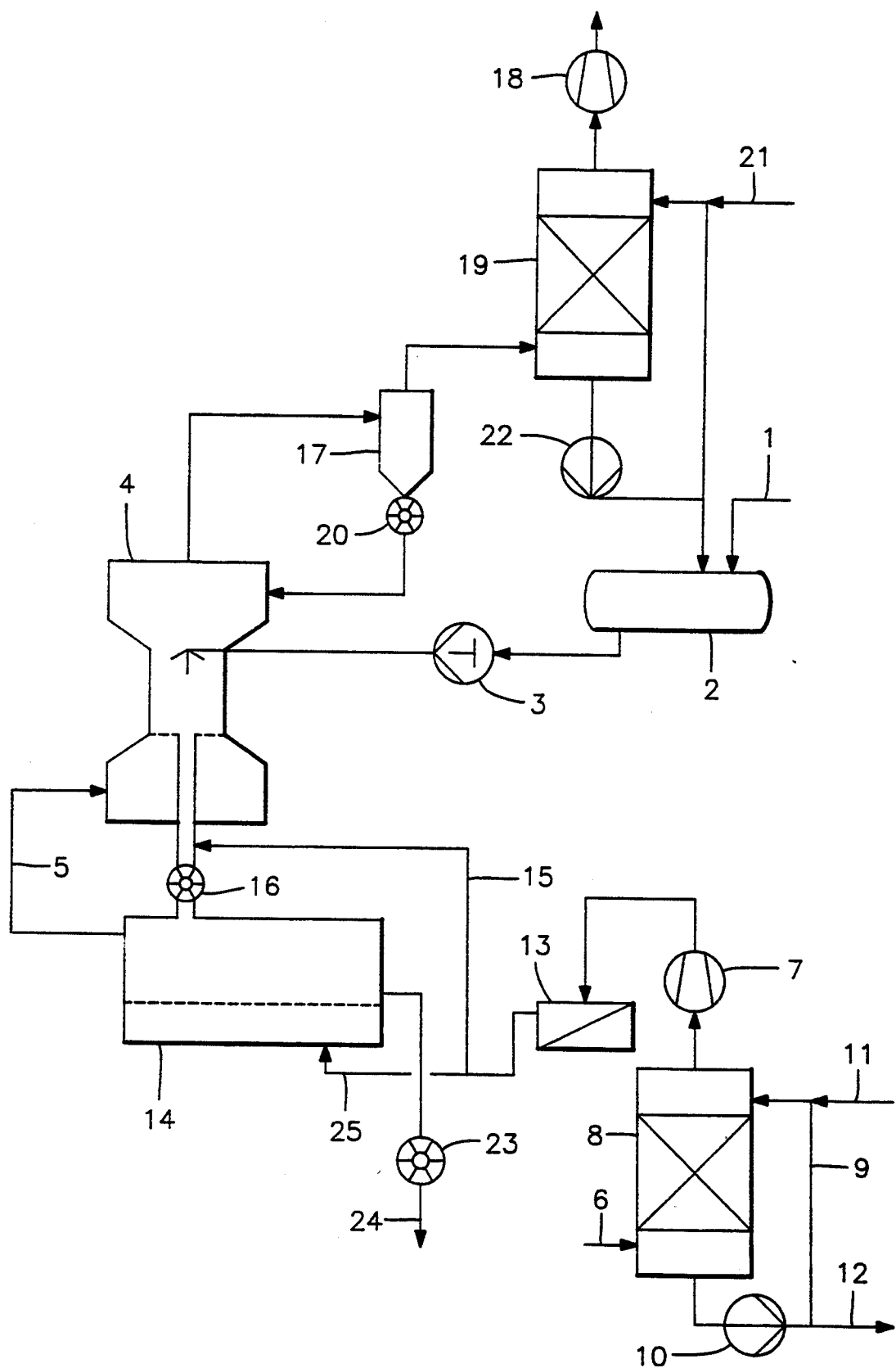
FIG. 1. shows in a schematic representation an arrangement for producing sodium cyanide granulate.

An aqueous sodium cyanide solution 1 with a content of 43% by mass sodium cyanide is passed through a nozzle from a bin 2 into the fluidized bed granulator 4 by means of dosing pump 3.

The fluidizing and drying medium for the granulator 4 is the air current 5 which previously passes through various apparatus.

To be able to produce granulate of high purity, an air current 6 is conducted by means of fan 7 via a $CO_2$ washing column 8 and is freed of carbon dioxide by counterflowing, dilute soda lye. The circulation of soda lye is produced by pump 10. The contentration of soda lye being limited by addition of fresh soda lye 11 and discharge of soda solution 12.

The air current is heated in a heat exchanger 13 to 220° C. and then divided into the air current 25 which in counterflow to the granulate from the granulator 4 serves in the fluidized bed drier 14 for secondary drying to a residual moisture of 0.1% by mass. and into the air current 15 which regulates a 5 mm grain size of the granules in the classifying discharge duct with cellular wheel 16 of the granulator 4. Between granulator and drier the residual moisture is 3% by mass. The air currents 5 and 15 united in the granulator are freed of 95% of the entrained NaCN dust in the downstream cyclone 17 and reach the wet separator 19 by means of suction fan 18. NaCN dust separated in the cyclone is recycled to the fluidized bed granulator 4 by way of the cellular wheel lock 20.

The washing liquor 21 for the wet separator 19 is circulated by way of the pump 22, through which a concentration takes place. In a certain cycle the washing liquor is pumped into the bin 2. The purified air issues to the atmosphere from the wet separator by way of fan 18.

The dried granulate 23 is removed from the fluidized bed drier 14 by means of cellular wheel lock 24 and can be fed to the packing.

We claim:

1. A process of producing solid sodium cyanide, comprising granulating an aqueous sodium cyanide solution containing 30 to 45% by weight sodium cyanide and containing up to 5% by weight solids in a two-step process in countercurrent flow with heated air wherein in the first process step the aqueous sodium cyanide solution is passed through a fluidized bed in a fluidized bed granulator produced by passing heated air from the second process step through the fluidized bed granulator, the heated air being cooled down to a temperature of 60° to 90° C. in the first process stem and then passed through a cyclone to remove entrained sodium cyanide dust, the removed sodium cyanide dust being recycled to the fluidized bed, the fluidized bed producing a sodium cyanide granulate of 2 to 6 mm in size which is discharged from the fluidized bed granulator through a classifying discharge duct, said sodium cyanide granulate being dried to a residual moisture of 1.5 to 4% by weight, and wherein in the second process step the granulate produced in the first process step is dried in a further fluidized bed by an air stream with an initial temperature of 150° to 230° C. to a residual moisture content less than 1.5% by weight and is removed from the further fluidized bed through a cellular wheel.

2. The process as claimed in claim 1, wherein the aqueous sodium cyanide solution is supplied uncooled from a continuous neutralizer to the fluidized bed granulator.

3. The process as claimed in claim 1, wherein the air stream in the second process step is freed of carbon dioxide by being passed in countercurrent flow with soda lye and then heated to the initial temperature of 150° to 230° C.

4. The process as claimed in claim 3 wherein a portion of the air stream heated to the initial temperature of 150° to 230° C. is introduced upstream of the classifying discharge duct.

5. The process as claimed in claim 1, wherein the air passed through the cyclone is then passed through a wet separator in countercurrent flow with washing liquor and then discharged to the atmosphere.

* * * * *